United States Patent
Hartwell et al.

(10) Patent No.: US 6,977,979 B1
(45) Date of Patent: Dec. 20, 2005

(54) ENHANCED CLOCK FORWARDING DATA RECOVERY

(75) Inventors: David Hartwell, Bolton, MA (US); Darrell Donaldson, Lancaster, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 823 days.

(21) Appl. No.: 09/652,459

(22) Filed: Aug. 31, 2000

(51) Int. Cl.[7] .................................................. H04L 7/00
(52) U.S. Cl. .......................................... 375/354; 375/376
(58) Field of Search ................................ 375/354–376; 327/141, 156; 365/193; 714/700; 710/52, 260; 331/1 A; 377/47

(56) References Cited

U.S. PATENT DOCUMENTS

| | | |
|---|---|---|
| 4,680,779 A | 7/1987 | Wakerly |
| 4,774,422 A | 9/1988 | Donaldson et al. |
| 4,829,515 A | 5/1989 | Donaldson et al. |
| 4,847,516 A | 7/1989 | Fujita et al. |
| 4,979,190 A * | 12/1990 | Sager et al. ................. 375/354 |
| 5,049,766 A | 9/1991 | van Driest et al. |
| 5,087,829 A | 2/1992 | Ishibashi et al. |
| 5,122,679 A | 6/1992 | Ishii et al. |
| 5,294,842 A | 3/1994 | Iknaian et al. |
| 5,307,381 A | 4/1994 | Ahuja |
| 5,311,081 A | 5/1994 | Donaldson et al. |
| 5,361,277 A | 11/1994 | Grover |
| 5,420,544 A | 5/1995 | Ishibashi |
| 5,486,783 A | 1/1996 | Baumert et al. |
| 5,517,147 A | 5/1996 | Burroughs et al. |
| 5,539,344 A | 7/1996 | Hatakenaka |
| 5,544,203 A | 8/1996 | Casasanta et al. |
| 5,548,249 A | 8/1996 | Sumita |
| 5,859,550 A | 1/1999 | Brandt |
| 6,334,163 B1 * | 12/2001 | Dreps et al. ................. 710/260 |
| 6,359,479 B1 * | 3/2002 | Oprescu ...................... 327/141 |
| 6,392,457 B1 * | 5/2002 | Ransijn ...................... 327/156 |
| 6,606,361 B1 * | 8/2003 | Rowell ....................... 375/355 |

* cited by examiner

*Primary Examiner*—Stephen Chin
*Assistant Examiner*—Curtis Odom

(57) ABSTRACT

A phase and edge aligned local clock signal is generated in a data-receiving unit by deriving the local clock signal from a forwarded clock signal received from a transmitting unit. The local clock signal is a delayed replica of the forwarded clock signal, such that the receiving unit maintains synchronism between the local clock signal and the forwarded clock signal. Thus, transfers from an input latch to other components in the receiving unit can be effected in step with the receipt of data in the input latch.

12 Claims, 1 Drawing Sheet

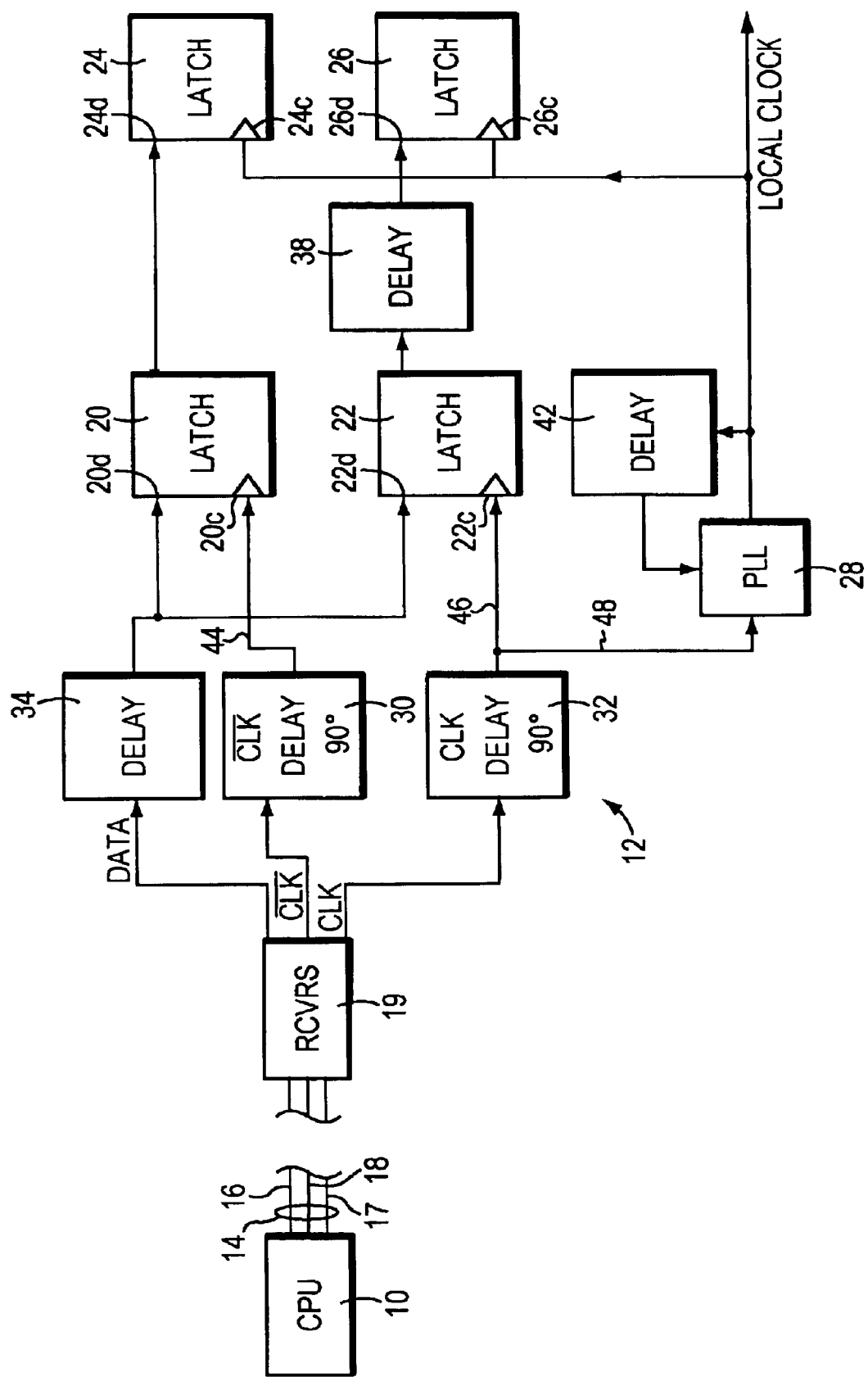

ENHANCED CLOCK FORWARDING DATA RECOVERY

INCORPORATION BY REFERENCE OF RELATED APPLICATIONS

This patent application is related to the following co-pending, commonly owned U.S. Patent Applications, all of which were filed on even date with the within application for United States Patent and are each hereby incorporated by reference in their entirely:

U.S. patent application Ser. No. 09/652,644 entitled ADAPTIVE DATA PREFETCH PREDICTION ALGORITHM;

U.S. patent application Ser. No. 09/653,133 entitled UNIQUE METHOD OF REDUCING LOSSES IN CIRCUITS USING $V^2$ PWM CONTROL;

U.S. patent application Ser. No. 09/652,641 entitled IO SPEED AND LENGTH PROGRAMMABLE WITH BUS POPULATION;

U.S. patent application Ser. No. 09/652,458 entitled PARTITION FORMATION USING MICROPROCESSORS IN A MULTIPROCESSOR COMPUTER SYSTEM;

U.S. Provisional Patent Application Ser. No. 60/304,167 entitled SYSTEM AND METHOD FOR USING FUNCTION NUMBERS TO INCREASE THE COUNT OF OUTSTANDING SPLIT TRANSACTIONS;

U.S. patent application Ser. No. 09/652,984 entitled SYSTEM AND METHOD FOR PROVIDING FORWARD PROGRESS AND AVOIDING STARVATION AND LIVELOCK IN A MULTIPROCESSOR COMPUTER SYSTEM;

U.S. patent application Ser. No. 09/653,180 entitled ONLINE ADD/REMOVAL OF SERVER MANAGEMENT INFRASTRUCTURE;

U.S. patent application Ser. No. 09/652,494 entitled AUTOMATED BACKPLANE CABLE CONNECTION IDENTIFICATION SYSTEM AND METHOD;

U.S. patent application Ser. No. 09/652,980 entitled CLOCK FORWARD INITIALIZATION AND RESET SIGNALING TECHNIQUE;

U.S. patent application Ser. No. 09/944,515 entitled PASSIVE RELEASE AVOIDANCE TECHNIQUE;

U.S. patent application Ser. No. 09/652,985 entitled COHERENT TRANSLATION LOOK-ASIDE BUFFER;

U.S. patent application Ser. No. 09/652,645 entitled DETERMINISTIC HARDWARE BEHAVIOR BETWEEN MULTIPLE ASYNCHRONOUS CLOCK DOMAINS THROUGH THE NOVEL USE OF A PLL; and U.S. patent application Ser. No. 09/655,171 entitled VIRTUAL TIME OF YEAR CLOCK.

FIELD OF THE INVENTION

This invention relates to the transfer of data between different integrated circuits (IC's). It is of particular utility in the transfer of data between IC's on different circuit boards interconnected by cables of varying lengths. The invention uses a novel clock-forwarding arrangement to synchronize operations on the data-receiving units to those on the transmitting chips.

BACKGROUND INFORMATION

The transfer of data between various units in a data-processing system is normally effected by a physical connection between an output latch on the transmitting unit and an input latch on the receiving unit This requires that the data be clocked into the input latch as it is received over the physical connection. At relatively low clock frequencies a system-wide clock can be used for this purpose. However, with high clock frequencies, corresponding with high data-transfer rates, clock skew, i.e. the difference in clock phase in different points in the system, presents a problem. Specifically, the clock edges at which the data is clocked into the input latches may not occur at the times the incoming data is received, resulting in errors in data reception.

To overcome this problem various clock-forwarding arrangements have been used, with transmitting units sending their clock signals to the receiving units along with the data. The clock signals arrive at the input latches of the latter units along with the data and the data is therefore clocked into the latches with greatly reduced clock-skew error.

Once received, the data must be moved from the input latch to other components that are to process the data in accordance with the function of the receiving unit. These components operate in synchronism with a local clock and the transfers from the input latch must therefore be effected in such manner as to accommodate the phase differences between the forwarded clock and the local clock. One can use a FIFO buffer for this purpose, the input latch being the input stage of the buffer. The buffer can thus be loaded in accordance with the forwarded clock and unloaded in accordance with the local clock. However to insure proper operation the buffer must be large enough to contain the largest burst of data that will be received by the receiving unit. This results in undue latency in each transfer, since incoming data must pass through the successive stages of the buffer before it is accessible to the receiving unit.

As connection lengths between the transmitting node and the receiving node change in a clock forwarded system, so does the phase relationship between the forwarded clock seen at the receiving node and the local clock at the receiving node. One can account for these phase differences by pre-calculating the expected phase differences and accounting for these differences in the receive logic by modifying when data is first removed from the FIFO. This has the advantage of reducing latency, but each time the connection length is changed, calculations must be made and the operation of the receive logic must be modified (which is typically accomplished via register bits that are written by an external means) in order to account for the change in length. In cases where connections between the transmitting node and the receive node are of great length, process variations within a standard connection length used may result in skews too great to be able to correct. In this instance, larger FIFOs must be again utilized and latencies increase and bandwidths suffer.

SUMMARY OF THE INVENTION

The present invention generates a phase and edge aligned local clock signal in the data-receiving unit by deriving it from the forwarded clock signal from the transmitting unit. Transfers from the input latch to other components in the receiving unit can be thus effected in step with the receipt of data in the input latch. Specifically, data can be transferred from the input latch after it has been loaded therein and before receipt of the next data transmission. For example, if the data is clocked into the input latch on positive-going edges of the clock signal, it can be transferred out of the input latch on negative going edges. This eliminates the latency incurred with the use of FIFO buffers, while insuring the validity of the data passed to other components in the receiving unit.

The invention is particularly applicable to double-data-rate transfers, in which a pair of input latches are loaded with data on alternate transitions of the forwarded clock signal. That is, one latch is loaded on positive-going edges and the second on negative-going edges. As described below, a slight delay is imposed in the transfer of data from one of the latches to a third latch that receives the concatenated data of the two input latches.

BRIEF DESCRIPTION OF THE DRAWINGS

The invention description below refers to the accompanying drawing which is a diagram of a data-receiving unit incorporating the invention.

DETAILED DESCRIPTION OF AN ILLUSTRATIVE EMBODIMENT

FIG. 1 illustrates the use of the invention in transmitting data from a central processor unit (CPU) 10 to a data unit 12. The units 10 and 12 are parts of a data processing system, which includes other units that need not be depicted for the purposes of this description. The unit 12 may be, for example, an input/output (I/O) Bridge that connects a processor to industry standard busses, such as Peripheral Component Interconnect (PCI), PCI Extended (PCI-X), Accelerated Graphics Port (AGP) busses and the like. It may reside on a separate circuit board from the CPU 10, in which case data transmissions from the CPU to the unit 12 pass over a cable 14. The cable 14 includes a set of data conductors 16 and clock conductors 17 and 18. The conductors 17 and 18 carry a clock signal; the versions on the two conductors being of opposite phase. The CPU 10 transmits data over the data conductors 16 in synchronism with the clock signal. Specifically, whenever a transition in a clock signal is transmitted from the CPU 10, corresponding data is transmitted over the conductors 16. The incoming signals pass through receivers 19.

The illustrated system provides for double data-rate transmissions. That is, the CPU 10 transmits data in synchronism with both the positive-going and negative-going transitions of the clock signal. However the invention is applicable also to systems in which the transmissions are synchronized with only the positive-going or negative-going transitions.

For data reception from the CPU 10, the receiving unit 12 includes a pair of input latches 20 and 22 that receive the data transmitted over the cable 14, a pair of latches 24 and 26 that concatenate the data received by the latches 20 and 22, and a phase-lock loop (PLL) 28 that generates a local clock signal for the unit 12. The latches 20 and 22 have data input terminals 20d and 22d that receive the data transmitted over the cable conductor 16. Clock input terminals 20c and 22c on latches 20 and 22 receive delayed versions of the clock signal from delay elements 30 and 32. The elements 30 and 32 preferably provide a delay of 90° to insure that the latches 20 and 22 are clocked after the data voltages have settled. A delay element 34 is interposed in the data input to compensate for delay of the clock signal caused by the load imposed by the inputs to which the latter signal is delivered.

The data output of the input latch 20 is applied directly to the data input terminal 24d of the latch 24.

The data output of the input latch 22 is applied to the data input terminal 26d of the latch 26 by way of a delay element 38 whose function is described below.

The phase lock loop 28 receives as a reference input the forwarded clock signal CLK from the CPU 10. The other input of the PLL 28 is provided by the output of the PLL, delayed by a delay element 42. The electrical lengths of clock lines 44, 46 and 48 are equal to each other. The output of the PLL is a local clock signal for the various components of the receiving unit 12 other than the input latches 20 and 22. The delay element 42 replicates the delay between the PLL 28 and the components that receive the local clock signals. These components are thus clocked in synchronization and in phase with the forwarded clock signal as received at the input latches 20 and 22.

The latch 22 is triggered by the positive-going edges of the incoming clock signal CLK and the latch 20 is triggered by the negative-going edges of the same signal. Thus the latches 20 and 22 are loaded on alternate clock edges. The latches 24 and 26 are both loaded on the positive-going edges of the local clock.

The delay element 38 is inserted between the output of the input latch 22 and the data input terminal of the latch 26 to deal with the effects of clock jitter, i.e., short term variations in the phase of the local clock relative to that of the forwarded clock signal applied to the latch 22. Both of the latches 22 and 26 respond to positive-going CLK edges. If a positive edge of the local clock arrives at the clock input terminal, 26c slightly before the arrival of the positive edge of the forwarded clock signal at the terminal 22c, valid data from the input latch 22 will be transferred to the latch 26. However, if the local clock edge arrives at the terminal 26c subsequent to the arrival of the corresponding edge at the terminal 22c, the contents of the latch 22 may change before they are be transferred to the latch 26. The delay unit 38 delays the arrival of the change in latch 22 contents at the data input terminal 26d so as to insure that even a slightly late clock edge at the terminal 26c will load the correct data into the latch 26.

There is no need for a corresponding delay in the data input of the latch 24, since it is clocked a half clock cycle before the next change in the contents of the input latch 20.

As a example of the delay provided by the delay unit 38, we have used a delay of 400 pico seconds with a clock frequency of 200 megahertz.

What is claimed is:

1. A data receiving unit for receiving data transmissions in which data is transmitted in parallel over a plurality of conductors and a forwarded clock signal, synchronized with the data, is received over a farther conductor, said unit comprising:
    a first latch connected to receive the data on said data conductors, said latch being clocked by said forwarded clock signal;
    means for maintaining a delayed replica of said forwarded clock signal in synchronism with said forwarded clock signal, said delayed replica being a local clock signal for internal operations of said receiving unit;
    a second latch connected to receive the contents of said first latch, said second latch being clocked by said local clock signal on transitions alternate to those on which said first latch is clocked.

2. A data receiving unit for receiving double-data-rate transmissions in which data is transmitted in parallel over a plurality of conductors and a forwarded clock signal, synchronized with the data, is received over a further conductor, said unit comprising:
    a. first and second input latches connected to receive the data on said data conductors, the first and second latches being clocked by alternate transitions of said forwarded clock signal,
    b. means for maintaining a delayed replica of said forwarded clock signal in synchronism with said forwarded clock signal, said delayed replica being a local clock signal for internal operations of said receiving unit, c. third and fourth latches connected to receive the contents of said first and second input latches, respectively, said third and fourth latches being clocked by transitions of said local clock signal.

3. The receiving unit defined in claim 2 in which said first and third latches are clocked by corresponding clock edges and further including a delay element disposed in the data path from said first latch to said third latch, thereby to prevent jitter in the relative phase of the clock signals applied to said first and third latches from causing errors in the transfer of data from said first latch to said third latch.

4. The data receiving unit defined in claim 2 in which the synchronism maintaining means synchronizes said delayed replica with the forwarded clock signal as received at said first latch.

5. The receiving unit defined in claim 2 in which said local clock signal is delayed relative to the forwarded clock signal by an interval that is substantially equal to the time required for the local clock signal to reach components in said receiving unit clocked by that signal.

6. The receiving unit of claim 1 wherein said local clock signal is delayed relative to the forwarded clock signal by an interval corresponding to the time required for the local clock signal to reach components clocked by the local clock signal in said receiving unit.

7. A method for receiving data transmissions at a data receiving unit, the method comprising:

receiving data at a first latch disposed in the data receiving unit;

receiving a forwarded clock signal, synchronized with the received data, at the first latch, the first latch being clocked on transitions of the forwarded clock signal;

maintaining synchronization between the forwarded clock signal and a delayed replica of the forwarded clock signal, the delayed replica being a local clock signal for internal operations of the data receiving unit; and forwarding the received data from the first latch to a second latch, the second latch being clocked by the local clock signal on transitions that are alternate to those on which the first latch is clocked.

8. The method of claim 7 wherein the local clock signal is delayed relative to the forwarded clock signal by an interval that is substantially equal to the time required for the local clock signal to reach components clocked by the local clock signal in the data receiving unit.

9. A method for receiving double-data-rate data transmissions at a data receiving unit, the method comprising:

receiving data at first and second latches in the data receiving unit;

receiving a forwarded clock signal, synchronized with the received data, at the first and second latches, the first and second latches being clocked on transitions of the forwarded clock signal;

maintaining synchronization between the forwarded clock signal and a delayed replica of the forwarded clock signal, the delayed replica being a local clock signal for internal operations of the data receiving unit; and forwarding the received data from the first and second latches to third and fourth latches, respectively, the third and fourth latches being clocked by the local clock signal on alternate transitions relative to the first and second latches.

10. The method of claim 9 wherein the local clock signal is delayed relative to the forwarded clock signal by an interval corresponding to the time required for the local clock signal to reach components clocked by the local clock signal in the data receiving unit.

11. The method of claim 9 wherein said first and third latches are clocked by corresponding clock edges, the method further comprising providing a delay element in the data path from the first latch to the third latch, the delay element configured to prevent jitter in the relative phase of the clock signals applied to the first and third latches.

12. The method of claim 9 further comprising synchronizing the delayed replica of the forwarded clock signal with the forwarded clock signal received at the first latch.

* * * * *

UNITED STATES PATENT AND TRADEMARK OFFICE
CERTIFICATE OF CORRECTION

PATENT NO.         : 6,977,979 B1                                            Page 1 of 1
APPLICATION NO. : 09/652459
DATED              : December 20, 2005
INVENTOR(S)        : David Hartwell et al.

It is certified that error appears in the above-identified patent and that said Letters Patent is hereby corrected as shown below:

On the Title page, in Item (54), in "Title", in column 1, line 1, delete "ENHANCED" before "CLOCK".

On the Title page, in Item (75), in "Inventors", in column 1, line 2, delete "Darrell Donaldson" and insert -- Darrel D. Donaldson --, therefor.

In column 1, line 1, delete "ENHANCED" before "CLOCK".

In column 4, line 44, in Claim 1, delete "farther" and insert -- further --, therefor.

Signed and Sealed this

Twenty-first Day of July, 2009

JOHN DOLL
*Acting Director of the United States Patent and Trademark Office*